United States Patent [19]

Mayeux

[11] Patent Number: 5,390,040
[45] Date of Patent: Feb. 14, 1995

[54] OPTICAL TRANSCEIVER FOR FREE-SPACE COMMUNICATION LINKS

[75] Inventor: Eric J. Mayeux, Littleton, Colo.

[73] Assignee: Martin Marietta Corporation, Bethesda, Md.

[21] Appl. No.: 191,941

[22] Filed: Feb. 4, 1994

[51] Int. Cl.$^6$ .............................................. H04B 10/00
[52] U.S. Cl. ..................................... 359/152; 359/113; 359/159; 359/172; 250/234
[58] Field of Search .............. 359/159, 168–170, 359/172, 152, 113, 858–859, 861–862; 250/203.2, 203.6, 206.2, 234

[56] References Cited

U.S. PATENT DOCUMENTS

| | | | |
|---|---|---|---|
| 3,813,553 | 5/1974 | Grossman | 250/347 |
| 3,989,942 | 11/1976 | Waddoups | 359/170 |
| 4,731,879 | 3/1988 | Sepp et al. | 359/169 |
| 4,867,560 | 9/1989 | Kunitsuge | 359/159 |
| 5,060,304 | 10/1991 | Solinsky | 359/152 |
| 5,142,400 | 8/1992 | Solinsky | 359/159 |
| 5,229,593 | 7/1993 | Cato | 250/205 |
| 5,282,073 | 1/1994 | Defour et al. | 359/159 |
| 5,285,461 | 2/1994 | Krasutsky et al. | 250/234 |

OTHER PUBLICATIONS

Bondurant et al., "An Opto-Mechanical Subsystem for Space Based Coherent Optical Communication," pp. 92–100, SPIE vol. 996 High Data Rate Atmospheric and Space Communications (1988).

Barry et al., "1000–Mbits/s Intersatellite Laser Communication System Technology,"pp. 470–478, IEEE Transactions on Communications (Apr. 1976).

Primary Examiner—Richard E. Chilcot, Jr.
Assistant Examiner—Kinfe-Michael Negash
Attorney, Agent, or Firm—Dorr, Carson, Sloan & Peterson

[57] ABSTRACT

An optical transceiver for full-duplex communications employs a single gimbaled steering mirror, a receiver for receiving an incoming beam reflected from a field of view on the central portion of the mirror, and a transmitter for directing an outgoing beam onto a peripheral portion of the steering mirror outside of the field of view of the receiver. In the preferred embodiment, the receiver includes a Cassegranian telescope that receives the incoming beam reflected by the steering mirror and directs the beam through a beam splitter to produce separate beams for tracking and data recovery. The transmitter consists of a plurality of lasers positioned at the periphery of the telescope that have been boresighted to effectively produce a combined beam that is substantially parallel to the incoming beam. The transmitted beam has a divergence of at least approximately 200 micro-radians.

23 Claims, 2 Drawing Sheets

OPTICAL TRANSCEIVER FOR FREE-SPACE COMMUNICATION LINKS

BACKGROUND OF THE INVENTION

1. Field of the Invention

The present invention relates generally to the field of optical transceivers. More specifically, the present invention discloses a full-duplex optical transceiver using a fixed telescope and a single steering mirror in which separate regions of the steering mirror are used for transmitting and receiving.

2. Statement of the Problem

In recent years, technological advancements in the efficiency, reliability, and manufacturability of lasers and optical detectors have led to the viability of laser communication systems as an alternative to conventional radio frequency (RF) systems. One of the inherent advantages of optical communications over RF stems from the relatively shorter wavelengths of the electromagnetic energy involved. Because of diffraction effects, a shorter wavelength allows the transmitted energy to be focused into a much smaller beam. This delivers the transmitted energy more efficiently to the remote communication terminal.

Past development efforts in optical communications have attempted to fully capitalize on this advantage. Systems have been proposed that attempt to collimate the laser energy into a beam width on the order of 1 to 10 micro-radians. Using currently realizable lasers, such systems are designed to support communications over ranges greater than 10,000 miles and at data rates exceeding hundreds of megabits per second. However, several disadvantages result. First, relatively large transmitter optics are required to obtain such tightly focused beams due to diffraction. Second, the need to point the beam and stabilize it to a fraction of the beam width (i.e., less than 1 95 micro-radian) leads to complex beam control systems and large gimbaled mechanisms. Third, the ultimate ability to deliver the transmitted energy to the remote communication terminal requires precise knowledge of the position of the remote communication terminal, which is usually obtained from tracking the signal received from the remote communication terminal. The transmit and receive optics must also be separated to prevent the local transmitted energy from affecting the local receiver, particularly if full-duplex communication is required. It then becomes necessary to mechanically maintain a very tight boresight tolerance to some small fraction of the transmit beam between the transmitter optics and the receiver optics. All of these factors result in heavy, high-power, complex, and costly designs. Such systems can still offer advantages over RF systems in applications involving long range, high data rate communications. However, in applications requiring much lower transmission ranges (i.e., less than 10,000 miles) and lower data rates, optical communication systems of the type described above do not favorably compare to RF systems in terms of power, weight, or cost.

A variety of different types of optical communication system have been invented in the past, including the following:

| Inventor | U.S. Pat. No. | Issue Date |
|---|---|---|
| Grossman | 3,813,553 | May 28, 1974 |
| Waddoups | 3,989,942 | Nov. 2, 1976 |
| Sepp et al. | 4,731,879 | Mar. 15, 1988 |
| Solinsky | 5,060,304 | Oct. 22, 1991 |
| Solinsky | 5,142,400 | Aug. 25, 1992 |

Bondurant et al., "An Opto-Mechanical Subsystem for Space Based Coherent Optical Communication," pages 92–100, SPIE Vol. 996 High Data Rate Atmospheric and Space Communications (1988).

Barry et al., "1000-Mbits/s Intersatellite Laser Communication System Technology," pages 470–478, IEEE Transactions on Communications (April 1976).

Grossman discloses a laser transceiver that uses a single objective lens and a mechanism similar to a single lens reflex camera for switching between transmitting and receiving modes of operation.

Waddoups discloses a retro-reflecting laser responder. The receiving apparatus includes two tracking mirrors 22, 23 and a telescope with Cassegranian optics. The received beam is split by a partially silvered mirror 34. A portion of the beam is modulated by an electro-optic modulator 29, and a portion is reflected to a tracking detector 37.

Sepp et al. disclose another example of a laser communications system (IFF) using a modulated retro-reflector.

The Solinsky patents disclose an optical transceiver system using a matched pair of reflecting telescopes, one each for transmitting and receiving. The telescopes use Cassegranian optics with an additional retro-reflector behind the aperture of the primary reflector. The received signal 34 is used both for demodulating data and tracking.

The paper by Bondurant et al. describes the opto-mechanical subsystem of the Laser Intersatellite Transmission Experiment (LITE) carried out by the MIT Lincoln Laboratory. The system uses telescope optics and a steerable coarse pointing mirror (CPM) with a common optical path for both transmitting and receiving data. FIG. 6 of this paper discuss the spatial acquisition sequence used to establish a communication link between two units by means of a broadened beam followed by a series of progressively narrower beams.

The paper by Barry et al. describes an intersatellite laser communication system developed by McDonnell Douglas Astronautics Company for the U.S. Air Force. A schematic representation of the optical configuration of the system is shown in FIG. 7 of the paper, including a telescope assembly and a plurality of mirrors for tracking and alignment.

3. Solution to the Problem

None of the prior art references uncovered in the search show an optical transceiver using a single steering mirror in which separate regions of the mirror are used for transmitting and receiving. In addition, the use of a divergent beam greatly relaxes the tracking and pointing tolerances required for the transceiver and permits the design to be much simpler, more compact, lighter weight, and less costly than previous designs.

SUMMARY OF THE INVENTION

This invention provides an optical transceiver for full-duplex, free-space communication links. The transceiver employs a single gimbaled steering mirror, a receiver for receiving an incoming beam reflected from a field of view on the central portion of the mirror, and a transmitter for directing an outgoing beam onto a peripheral portion of the steering mirror outside of the field of view of the receiver. In the preferred embodiment, the receiver includes a Cassegranian telescope that receives the incoming beam reflected by the steering mirror and directs the beam through a beam splitter to produce separate beams for tracking and data recovery. The transmitter consists of a plurality of lasers positioned at the periphery of the telescope that have been boresighted to effectively produce a combined beam that is substantially parallel to the incoming beam. The transmitted beam has a divergence of at least approximately 200 micro-radians.

A primary object of the present invention is to provide an optical transceiver that reduces the criticality of boresight tolerances for pointing and tracking.

Another object of the present invention is to provide an optical transceiver that is simpler, more compact, and lighter weight than previous designs.

Yet another object of the present invention is to provide an optical transceiver that is less costly and more reliable than previous designs.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
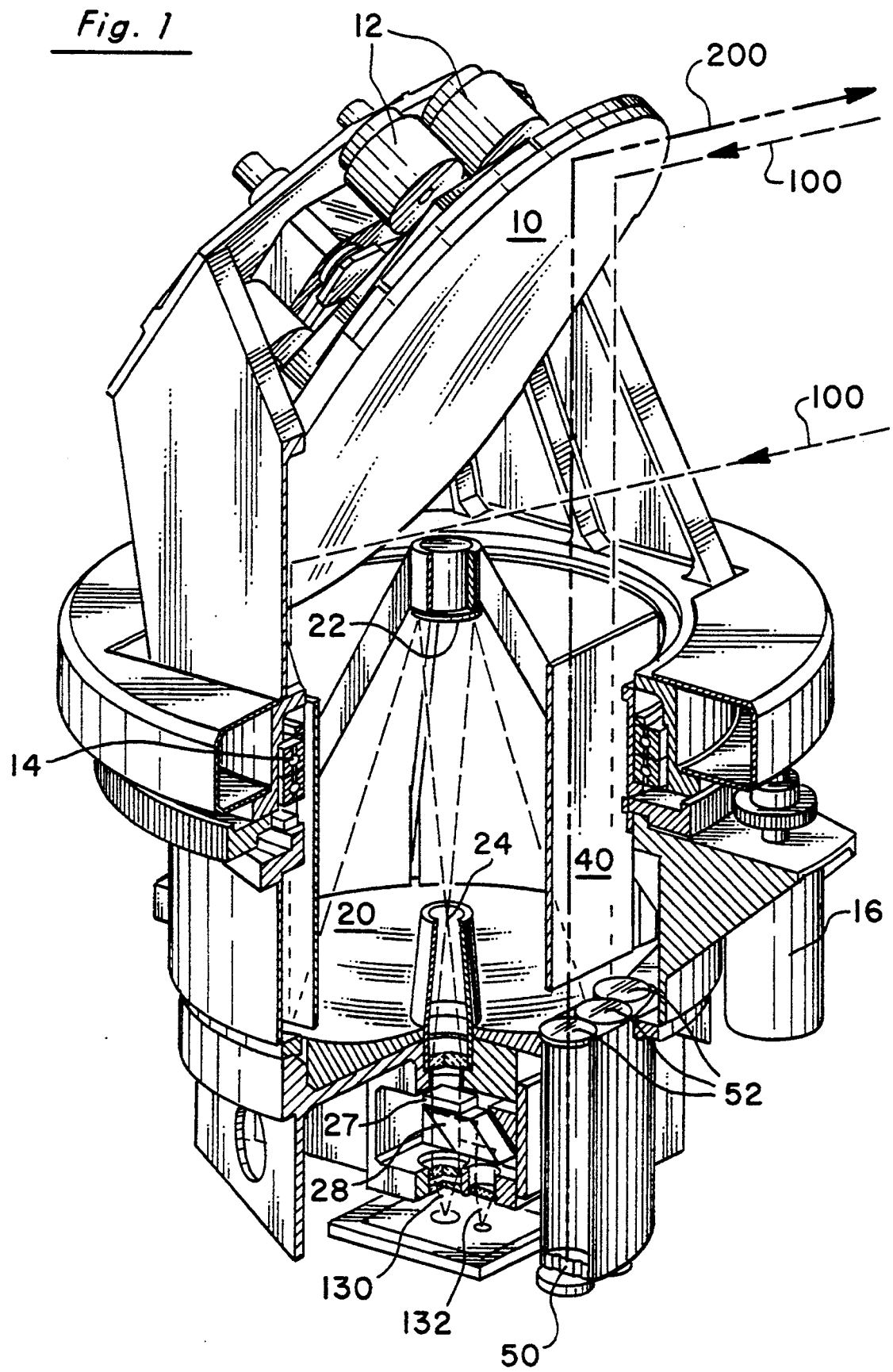
FIG. 1 is a perspective view of the present optical transceiver with a portion cut away to reveal the receiver telescope optics.
Figure 2:
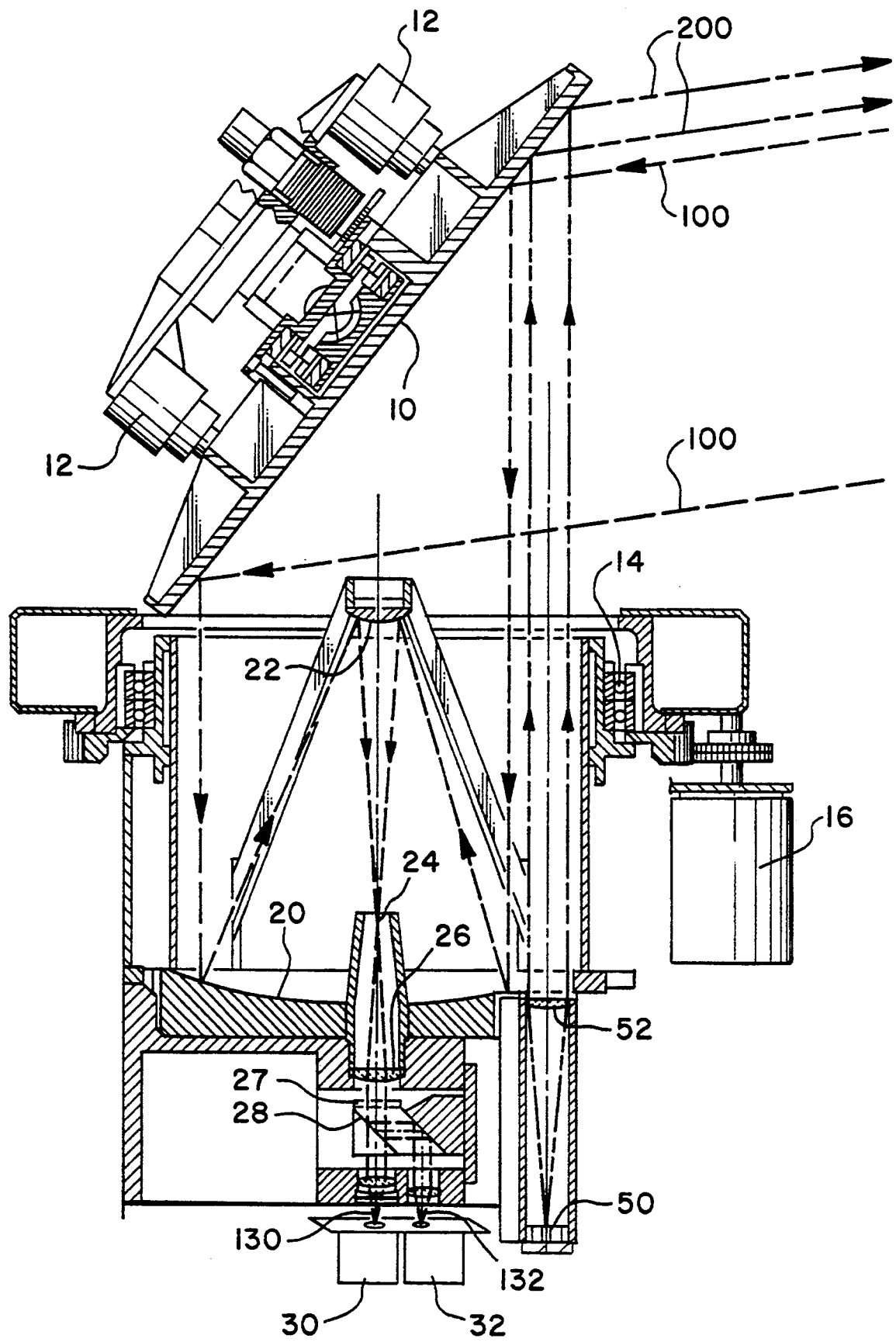
FIG. 2 is a cross-sectional view of the optical transceiver.

Turning to FIG. 1, a perspective view is provided of the present optical transceiver in which a portion has been cut away to reveal the optics of the receiver telescope. A corresponding cross-sectional view is illustrated in FIG. 2. The present transceiver is intended to provide two-way communications with a similar remote transceiver. For example, the present invention can be used to facilitate free-space communications links between satellites. The distance between satellites dictates that the incoming beam 100 and outgoing beam 200 are essentially parallel to one another for each satellite.

The optical transceiver has three major subassemblies. The first subassembly is a gimbaled steering mirror 10 to reflect both the incoming beam for receiving data and the outgoing beam used for transmitting data. The second is the receiver assembly consisting of a telescope, data detector, and tracking detector to receive the incoming beam reflected by the steering mirror. The third is the transmitter assembly consisting of a number of lasers to generate an outgoing beam that is also reflected by the steering mirror in a direction parallel to that of the incoming beam. The outgoing beam is reflected by a region of the steering mirror outside of the field of view of the telescope to allow full-duplex communications while minimizing interference or cross-talk between the receiver assembly and the transmitter assembly.

The steering mirror 10 has a substantially flat reflective surface. The steering mirror is gimbaled to rotate about both an azimuth axis and an elevational axis. A number of electro-mechanical actuators 12 control the elevation of the steering mirror 10. A turntable assembly 14 allows rotation of the steering mirror 10 about the azimuth axis. A stepper motor 16 controls the position of the turntable 14.

The steering mirror 10 is oriented by the actuators 12 and turntable assembly 14 to reflect the incoming beam 100 into a telescope along its optical axis. In the preferred embodiment, the telescope employs Cassegranian optics using a primary reflector 20 and secondary reflector 22, as shown in the figures. However, other equivalent reflective or refractive optical systems could be substituted to focus the incoming beam reflected by the steering mirror. The primary reflector 20 focuses the incoming beam onto the secondary reflector 22. The beam is then reflected by the the secondary reflector 22 and focused in the plane of the system field stop 24. It then proceeds through a recollimating lens 26 and a narrow-band optical filter 27 that is matched to the operating wavelength of the system. A rhomboid prism beam splitter 28 divides the incoming beam into two beams. Approximately 10% of the optical energy proceeds directly through the beam splitter 28 to a lens set that focuses the beam 130 onto a low-bandwidth quad cell avalanche photodiode 30, as shown in FIG. 2. The other 90% of the beam 132 is reflected laterally along the axis of the rhomboid prism and is then reflected downward parallel to the optical axis of the telescope through a focusing lens onto a wide-bandwidth avalanche photodiode data detector 32 as shown in FIG. 2. The geometric characteristics of the rhomboid prism 28 ensure that the two beams are maintained parallel to one another with a minimum of alignment sensitivity at installation.

The output of the quad cell tracking detector is low-pass filtered, sampled, and combined to produce the two traditional pointing error signals output of a quadrant tracking receiver. These two error signals represent the angular displacement of the spot created by the incoming beam relative to the center of the quad cell tracking detector, in two orthogonal axes. These error signals are used to command the gimbaled steering mechanism to reposition the spot at the center of the quad cell tracking detector.

The transmitter consists of a number of laser assemblies arranged around the periphery of the telescope. The laser assemblies can be used in multiple combinations to increase the power of the transmitted beam, or can be maintained as reliability backups. Each laser assembly consists of a laser diode 50 mounted to a heat sink. Directly in front of the diode facet is a cylindrical microlens to circularize the elliptical beam resulting from the rectangular facet of the diode. This light is captured by a collimating lens 52 and collimated to the desired beam divergence. The multiple transmit laser assemblies are typically directed to produce a combined overlapping beam in the far field of the transceiver having a divergence of at least approximately 200 micro-radians. A baffle plate 40 separates the path of the outgoing beam 200 from the receiver telescope to prevent help minimize interference between the outgoing beam 200 and the incoming beam 100.

Because the transmitter package is relatively small, it can be made of a thermally stable material, such as invar, to passively maintain alignment without significantly increasing system weight. This package is intimately mounted to the telescope to minimize the amount of structure between the two, resulting in minimized thermal gradients and increased optical alignment stability.

The transmitted beam 200 is directed by the laser assemblies onto a region of the steering mirror 10 that is outside of the field of view of the telescope. In the preferred embodiment, the field of view of the telescope occupies the central portion of the steering mirror and the transmitted beam is reflected by a peripheral portion of the steering mirror 10, as shown in the drawings. With the steering mirror positioned to maintain the incoming beam on the optical axis of the telescope, and given the boresight alignment of the transmitter and receiver telescope, the outgoing beam will be reflected parallel to the incoming beam back to the remote transceiver to close the link.

In certain situations, such as communications between satellites in space, the relative velocity between satellites can be large enough that the finite time for propagation of light results in a significant change in the relative angular position of the remote satellite between the time when it transmits a signal and the time when a signal that has been transmitted back intercepts it. This is taken into account by providing an electronic bias on the quad cell detector error signals so as to position the steering mirror to point the transmitted beam ahead of the received beam based on a priori knowledge of both satellites' ephemeris.

Prior to communicating data, the satellites must first operate in acquisition mode while trying to establish a communications link. In this situation, the beam from the remote satellite is not yet flooding the steering mirror aperture. Consequently, no error signal is available from the quad cell tracking detector to control the gimbaled steering mirror mechanism. At the beginning of the acquisition mode, the pointing system is dependent on a priori knowledge of the remote satellite's general position and on knowledge of the general position and attitude of the host satellite. Unfortunately, the range of error in this information is typically larger than the diameter of the transmitted beam, and may also be larger than the field of view of the receiver. Acquisition in this scenario requires a cooperative step-stare approach in which one transceiver exhaustively scans a portion of space that is at least as large as the area of uncertainty concerning the second satellite's position. Meanwhile, the second satellite stares at one portion of its uncertainty space long enough for the first satellite to complete one entire scan pattern. While in this mode, the pointing and stabilization of the transceiver line-of-sight is maintained by closing a control loop around position sensors defining the position of the mirror with respect to the platform, and by inertial motion sensors (e.g., gyroscopes and star trackers) that measure motion of the platform. This information combined with geometric knowledge of the orientation of the mirror allows the transmit beam and the field of view of the receiver to be accurately directed anywhere within the area of uncertainty containing the other satellite.

The above disclosure sets forth a number of embodiments of the present invention. Other arrangements or embodiments, not precisely set forth, could be practiced under the teachings of the present invention and as set forth in the following claims.

I claim:

1. An optical transceiver for full-duplex communications comprising:
    a gimbaled steering mirror;
    positioning means for moving said steering mirror into desired orientations;
    a receiver for receiving an incoming beam reflected from a predetermined field of view on said steering mirror; and
    a transmitter for directing an outgoing beam onto said steering mirror in a predetermined region of said steering mirror outside said field of view of said receiver.

2. The optical transceiver of claim 1, wherein said receiver comprises:
    a detector; and
    a telescope for focusing said incoming beam onto said detector.

3. The optical transceiver of claim 2, wherein said telescope comprises Cassegranian optics.

4. The optical transceiver of claim 2, further comprising baffle means for isolating said incoming beam from said outgoing beam.

5. The optical transceiver of claim 1, wherein said transmitter comprises a plurality of lasers aligned to produce an overlapping beam at distances remote from said transceiver.

6. The optical transceiver of claim 1, wherein said transmitter produces a beam having a divergence of at least approximately 200 micro-radians.

7. The optical transceiver of claim 1, wherein said receiver further comprises a beam splitter for splitting said incoming beam into a first portion used for tracking and a second portion used for recovering data.

8. The optical transceiver of claim 7, further comprising a quad cell photodetector for receiving said tracking portion of said incoming beam.

9. The optical transceiver of claim 1, wherein said steering mirror comprises a flat reflective surface and said transmitter is boresighted to produce an outgoing beam that is substantially parallel to said incoming beam.

10. The optical transceiver of claim 1, wherein said field of view of said receiver covers a central portion of said steering mirror and said transmitter directs said outgoing beam onto a peripheral portion of said steering mirror.

11. An optical transceiver for full-duplex communications comprising:
    a gimbaled steering mirror having a flat reflective surface;
    a detector for recovering data from an incoming beam;
    a telescope for receiving an incoming beam reflected along a predetermined axis from within a predetermined field of view on said steering mirror, and for focusing said incoming beam onto said detector;
    positioning means for controlling the azimuth and elevational orientation of said steering mirror relative to said axis of said telescope; and
    at least one transmitting laser for directing an outgoing beam parallel to said axis of said telescope onto a portion of said steering mirror outside of said field of view of said telescope.

12. The optical transceiver of claim 11, wherein said telescope comprises Cassegranian optics.

13. The optical transceiver of claim 11, further comprising baffle means for isolating said incoming beam from said outgoing beam.

14. The optical transceiver of claim 11, wherein said transmitter comprises a plurality of lasers aligned to produce an overlapping beam at distances remote from said transceiver.

15. The optical transceiver of claim 11, wherein said transmitter produces a beam having a divergence of at least approximately 200 micro-radians.

16. The optical transceiver of claim 11, further comprising a beam splitter for splitting said incoming beam focused by said telescope into a first portion used for tracking and a second portion used for recovering data.

17. The optical transceiver of claim 16, further comprising a quad cell photodetector for receiving said tracking portion of said incoming beam.

18. The optical transceiver of claim 11, wherein said field of view of said telescope covers a central portion of said steering mirror and said transmitting laser directs said outgoing beam onto a peripheral portion of said steering mirror.

19. An optical transceiver for full-duplex communications comprising:
   a gimbaled steering mirror having a flat reflective surface;
   positioning means for controlling the azimuth and elevational orientation of said steering mirror relative to a predetermined axis;
   a telescope extending along said axis for focusing an incoming beam reflected from within a predetermined field of view on said steering mirror;
   a beam splitter for splitting said incoming beam focused by said telescope into a first beam and a second beam;
   a data detector for recovering data from said first beam;
   a tracking detector for receiving said second beam and generating a tracking signal to control said positioning means; and
   at least one transmitting laser for directing an outgoing beam parallel to said axis onto a portion of said steering mirror outside of said field of view of said telescope.

20. The optical transceiver of claim 19, wherein said transmitting lasers produce a combined beam having a divergence of at least approximately 200 micro-radians.

21. The optical transceiver of claim 19, wherein said telescope comprises Cassegrainian optics.

22. The optical transceiver of claim 19, further comprising baffle means for isolating said incoming beam from said outgoing beam.

23. The optical transceiver of claim 19, wherein said tracking detector comprises a quad cell photodetector.

* * * * *